United States Patent
Asakura et al.

[11] Patent Number: 5,730,664
[45] Date of Patent: Mar. 24, 1998

[54] SOLID GOLF BALL

[75] Inventors: Takeshi Asakura; Keiji Moriyama, both of Shirakawa, Japan

[73] Assignee: Sumitomo Rubber Industries, Ltd., Hyogo-ken, Japan

[21] Appl. No.: 729,409

[22] Filed: Oct. 11, 1996

[51] Int. Cl.$^6$ .......................... A63B 37/06; A63B 37/12
[52] U.S. Cl. .............................. 473/373; 473/374
[58] Field of Search .......................... 473/372, 373, 473/374, 375, 376, 377

[56] References Cited

U.S. PATENT DOCUMENTS

| | | |
|---|---|---|
| 4,674,751 | 6/1987 | Molitor et al. ............ 473/385 |
| 4,863,167 | 9/1989 | Matsuki et al. ........... 473/373 |
| 5,002,281 | 3/1991 | Nakahara et al. ......... 473/373 |
| 5,439,227 | 8/1995 | Egashira et al. .......... 473/373 |

FOREIGN PATENT DOCUMENTS 0661082   7/1995   European Pat. Off. .

*Primary Examiner*—George J. Marlo
*Attorney, Agent, or Firm*—Birch, Stewart, Kolasch & Birch, LLP

[57] ABSTRACT

The present invention provides a golf ball, particularly a golf ball having excellent shot feel and spin performance without deteriorating flight distance and durability which are specific features of the solid golf ball. The solid golf ball of the present invention comprises a core (1) and a cover formed on the core, the cover having a two-layer cover structure of an inner cover layer (2) and an outer cover layer (3), wherein the core (1) is obtained from a rubber composition comprising 100 parts by weight of a base rubber and 18 to 28 parts by weight of a metal salt of an unsaturated carboxylic acid and the inner cover layer (2) has a specific gravity of 1.2 to 1.5, a thickness of 0.5 to 2.0 mm and a Shore D hardness within the range of more than that of the outer cover layer (3) and not more than 80 and, the outer cover layer (3) has a specific gravity of 0.5 to less than 1.2, a thickness of 1.0 to 2.5 mm and a Shore D hardness of 63 to 73.

5 Claims, 1 Drawing Sheet

SOLID GOLF BALL

FIELD OF THE INVENTION

The present invention relates to a golf ball. More particularly, it relates to a golf ball having excellent shot feel and spin performance without deteriorating flight distance and durability which are specific features of a solid golf ball.

BACKGROUND OF THE INVENTION

There have been mainly two kinds of golf balls. One is a solid golf ball (e.g. solid two-piece golf ball, etc.), which comprises a core formed from vulcanized rubber and a cover formed from a thermoplastic resin (e.g. ionomer resin, etc.) covered on the core. The other is a thread wound golf ball, which is produced by winding a rubber thread around a solid or liquid center, followed by covering with a cover of an ionomer resin or balata having a thickness of 1 to 2 mm.

Since the solid golf ball has good durability and faster initial velocity at the time of hitting in comparison with the thread wound golf ball, the solid golf ball has longer flight distance and excellent flight performance. The solid golf balls therefore have been used by many golfers, especially amateur golfers. The solid golf ball, however, has some defects, that is, poor shot feel and small spin amount due to faster initial velocity at the time of hitting and small contact area between the golf ball and a golf club. Therefore, spin is not easily put on the golf ball and the solid golf ball lacks in controllability at approach shot. Professional golfers and upper-level golfers who consider shot feel and controllability important do not like the solid golf ball.

In order to solve the above problems, it has been suggested that the cover is made soft and imparts flexibility to the cover of the golf ball so as to obtain shot feel similar to that of the thread wound golf ball. However, in order to obtain a soft feeling solid golf ball, it is necessary that the core is also made soft. The solid golf ball containing a solid core shows poor impact resilience so that flight distance and durability are deteriorated. The controllability of the golf ball can be ideal when at driver shot the golf ball is easily controlled because a contact time between the club and the ball is longer and at approach shot the ball shows high spin amount. However, when the core is softened, the spin amount is decreased and, therefore, the controllability is lowered.

OBJECTS OF THE INVENTION

That is, a main object of the present invention is to solve the above problem of a conventional solid golf ball, thereby providing a solid golf ball having excellent shot feel and spin performance without deteriorating flight performance and durability which are special features of the solid golf ball.

This object as well as other objects and advantages of the present invention will be apparent to those skilled in the art from the following description with reference to the accompanying drawing.

SUMMARY OF THE INVENTION

Figure 1:
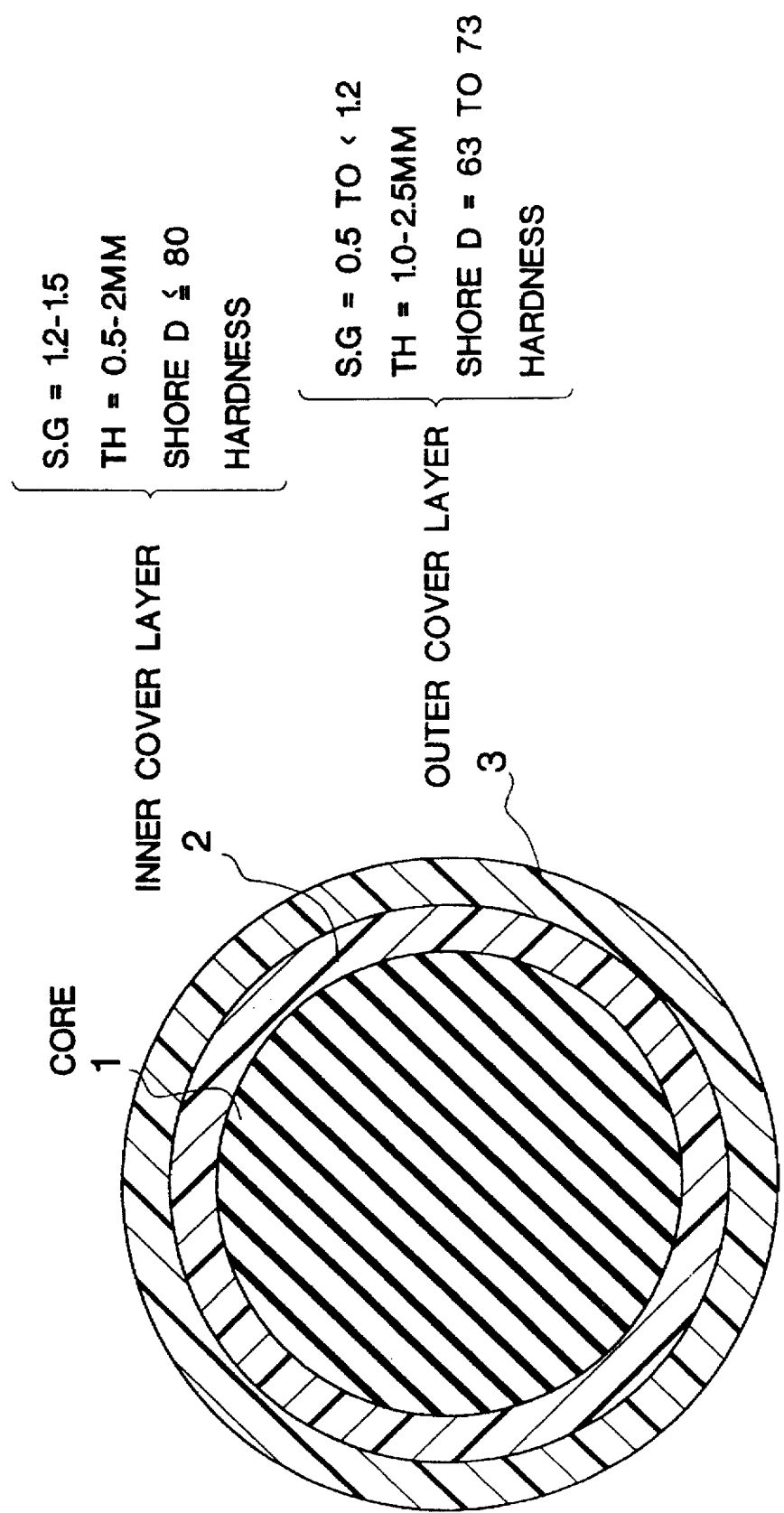
FIG. 1 is a schematic cross section illustrating the golf ball of the present invention.

The present invention provides a solid golf ball comprising a core (1) and a cover formed on the core, the cover having a two-layer cover structure of an inner cover layer (2) and an outer cover layer (3), wherein the core (1) is obtained from a rubber composition comprising 100 parts by weight of a base rubber and 18 to 28 parts by weight of a metal salt of an unsaturated carboxylic acid and the inner cover layer (2) has a specific gravity of 1.2 to 1.5, a thickness of 0.5 to 2.0 mm and a Shore D hardness within the range of more than that of the outer cover layer (3) and not more than 80 and, the outer cover layer (3) has a specific gravity of 0.5 to less than 1.2, a thickness of 1.0 to 2.5 mm and a Shore D hardness of 63 to 73.

In order to carry out the present invention more suitably, it is preferred that the core has a deformation amount formed between an initial load of 10 Kg and a final load of 130 Kg within the range from 4.0 to 6.0 mm.

It is also preferred that the inner cover layer is formed from a mixture of an ionomer resin and a polyamide resin and an amount of the polyamide resin formulated is within the range from 3 to 25% by weight.

It is further preferred that the inner cover layer cover contains high-specific gravity filler, such as tungsten powder.

DETAILED DESCRIPTION OF THE INVENTION

In the golf ball of the present invention, the two cover layers (2 and 3) are formed on a core (1). The core is obtained by pressure molding a rubber composition at an elevated temperature. The rubber composition comprises a base rubber, a crosslinking agent, a metal salt of an unsaturated carboxylic acid and the like.

The base rubber can be natural and/or synthetic rubbers which have hitherto been used for the solid golf ball. Among them, preferred is a high-cis polybutadiene having a cis-1, 4-structure of not less than 40%, preferably not less than 80%, into which natural rubber, polyisoprene rubber, styrene-butadiene rubber, EPDM, etc. may be optionally formulated.

Examples of the crosslinking agent include organic peroxides such as dicumyl peroxide or t-butyl peroxide, and dicumyl peroxide is preferred. An amount of the crosslinking agent formulated may preferably be within the range from 0.3 to 5.0 parts by weight, preferably from 0.5 to 3.0 parts by weight, based on 100 parts by weight of the base rubber.

To the rubber composition used for the production of the solid golf ball of the present invention, a metal salt of an unsaturated carboxylic acid is added in addition to the above materials. Examples of the metal salt of the unsaturated carboxylic acid include monovalent of divalent metal salts of an unsaturated carboxylic acid having 3 to 8 carbon atoms, such as acrylic or methacrylic acid. Among them, zinc acrylate is preferred for imparting high rebound characteristics. An amount of the metal salt of unsaturated carboxylic acid formulated is within the range from 18 to 28 parts by weight based on 100 parts by weight of the base rubber. When the amount is more than 28 parts by weight, the resultant golf ball is too hard and shot feel is inferior. On the other hand, when the amount is less than 18 parts by weight, rebound characteristics are poor.

The rubber composition may contain additives which have been used for producing the solid core, such as organic sulfide compounds (e.g. polysulfides having 2 to 4 sulfur atoms, for example diphenyl polysulfide, dibenzyl polysulfide, dibenzoyl polysulfide, dibenzothiazoyl polysulfide, dithiobenzoyl polysulfide, etc.) and tetraalkylthiuram sulfide; inert fillers such as zinc oxide, barium sulfate, calcium carbonate, etc.; antioxidants; and the like. An amount of the organic sulfide compound is 0.5 to 2.0 parts by weight, based on 100 parts by weight of the base rubber. An amount of the inert filler is preferably within the range of from 16 to 19 parts by weight, based on 100 parts by weight of the base rubber. An amount of the antioxidant is preferably 0.2 to 0.5 parts by weight, based on 100 parts by weight of the base rubber.

The core can be obtained by molding the above rubber composition with heating using suitable method and condition, which are generally used for the solid core. The core preferably has a diameter of 32 to 37.5 mm. In order to obtain the desired shot feel, the core preferably has a deformation amount formed between an initial load of 10 Kg and a final load of 130 Kg within the range from 4.0 to 6.0 mm. When the deformation amount is less than 4.0 mm, the solid core is too hard. On the other hand, when the deformation amount is more than 6.0 mm, the solid core is too soft. The core may be composed of either one layer or two or more layers.

Then, the core (1) is covered with the inner cover layer (2) and outer layer cover (3). The cover can be formed from an ionomer resin which has been used as a cover material of the solid golf ball, and specific examples of the ionomer resin include Hi-milan 1557, 1605, 1652, 1705, 1706, 1707, 1855 and 1856 (which are manufactured by Mitsui Du Pont Polychemical Co., Ltd.) and Iotec 7010 and 8000 (which are manufactured by Exxon Co.) but are not limited thereto. Among them, Hi-milan 1706, Iotec 8000 or a combination thereof is preferably used for the inner cover layer (2), and Hi-milan 1652, 1706, 1707 or 1855 or a combination thereof is preferably used for the outer cover layer (3). A small amount of the other resins may also be added.

It is preferred that the inner cover layer (2) is formed from either the above mentioned ionomer resin or a mixture of the ionomer resin and polyamide resin. The mixing ratio of the polyamide resin can be within the range from 0 to 25% by weight, preferabley 3 to 25% by weight. The polyamide resin can be any type of polyamide resins which are commercially available, but nylon 12 is preferred. A hardness of the inner cover layer can be increased by adding the polyamide resin to the inner cover layer. When the mixing ratio of the polyamide resin is more than 25% by weight, the cover is too hard and durability is poor. On the other hand, when the amount is smaller than 3% by weight, the technical effects derived therefrom are small.

The cover composition may contain additives such as inorganic fillers (e.g. zinc oxide, barium sulfate, etc.) and colorants (e.g. titanium dioxide, etc.). High-specific gravity fillers can be added to the inner cover layer for the purpose of adjusting the specific gravity. Examples of the high-specific gravity filler include metal powder, metal oxide, metal nitride, metal carbonate, etc., for example, tungsten, tungsten carbide, molybdenum, lead, lead oxide, nickel and copper or a mixture thereof. In addition, barium sulfate, titanium dioxide or zinc white whose specific gravity is comparatively small may be used in place or addition of the high-specific gravity filler and a mixture of these fillers and high-specific filler may also be used.

The inner cover layer has a specific gravity of 1.2 to 1.5, a thickness of 0.5 to 2.0 mm and a Shore D hardness within the range of more than that of the outer cover layer (3) and not more than 80. When the specific gravity of the inner cover layer is less than 1.2, inertia moment is small and spin is liable to be disappeared (decayed). On the other hand, when the specific gravity is more than 1.5, the amount of the filler is large and it is difficult to conduct molding. When the thickness of the cover is smaller than 0.5 mm, durability is lowered. On the other hand, when the thickness is more than 2.0 mm, shot feel is hard and poor. When the hardness of the cover is less than the Shore D hardness of the outer cover layer (3), rebound characteristics are deteriorated and flight distance is lowered. On the other hand, when the hardness is more than 80, shot feel is hard and poor. The Shore D hardness is a hardness measured according to ASTM D-2240.

The outer cover layer has a specific gravity of 0.5 to less than 1.2, a thickness of 1.0 to 2.5 mm and a Shore D hardness of 63 to 73. When the specific gravity of the outer cover layer is 1.2 or more, the ball weight is too large and it is difficult to obtain a golf ball suitable for the weight limitation of golf balls. On the other hand, it is difficult to adjust the specific gravity to less than 0.5. When the thickness of the cover is less than 1.0 mm, durability is deteriorated. On the other hand, when the thickness is more than 2.5 mm, rebound characteristics are deteriorated, thereby lowering flight distance. When the cover hardness is less than 63 (Shore D hardness), rebound characteristics are deteriorated, thereby lowering flight distance. On the other hand, when the hardness is more than 73, shot feel is hard and poor.

To the cover layer (inner cover layer (2) and outer cover layer (3)), for example, colorants (e.g. titanium oxide, etc.) and other additives (e.g. ultraviolet absorbers, photostabilizers, fluorescent materials, fluorescent brighteners, etc.) may be formulated within the range at which the desired characteristics due to the golf ball cover are not deteriorated. An amount of the colorant is preferably within the range from 0.1 to 0.5 parts by weight.

The preferred formulations of the inner cover layer (2) and outer cover layer (3) of the present invention are shown below but are not limited thereto.

| Kind | Inner cover layer | (Parts by weight) Outer cover layer |
|---|---|---|
| Ionomer resin | 75–100 | 90–100 |
| Polyamide resin | 0–25 | — |
| High-specific gravity filler | 25–40 | — |
| Filler | — | 0–5 |
| Pigment | — | 0–0.05 |
| Antioxidant | — | 0–0.5 |

The cover layer in the present invention is formed by per se known methods which are used for forming the cover of the golf ball, for example, injection molding, press molding, etc. Firstly, the core (1) is covered with inner cover (2), and then the outer cover (3) is covered thereon. When the outer cover (3) is covered, a lot of recesses referred to as dimples are generally formed on the surface. In order to enhance appearance and commercial value, the golf ball of the present invention is generally put on the market after coating with paint.

According to the present invention, there is provided a golf ball having excellent shot feel and spin performance without deteriorating flight performance.

EXAMPLES

The following Examples and Comparative Examples further illustrate the present invention in detail but are not to be construed to limit the scope thereof.

Production of core

The formulations shown in Table 1 were respectively kneaded and then vulcanization-molded to obtain a spherical core having a diameter of 35.1 mmφ. The vulcanization was conducted in two stages. For example, the vulcanization was conducted at 140° C. for 16 minutes, then at 165° C. for additional 8 minutes.

TABLE 1

| Kind | I | II | III | IV | V | VI |
|---|---|---|---|---|---|---|
| | | | | | | (Parts by weight) |
| BR-18 (Note 1) | 100 | 100 | 100 | 100 | 100 | 100 |
| Zinc acrylate | 22 | 19 | 14 | 33 | 22 | 22 |
| Zinc oxide | 17.6 | 18.7 | 20.6 | 13.3 | 32.2 | — |
| Antioxidant (Note 2) | 0.5 | 0.5 | 0.5 | 0.5 | 0.5 | 0.5 |
| Dicumyl peroxide | 1.6 | 1.6 | 1.8 | 1.4 | 1.6 | 1.6 |
| Diphenyl peroxide | 0.5 | 0.5 | 0.5 | 0.5 | 0.5 | 0.5 |

Vulcanization condition: 140° C. × 16 minutes + 165° C. × 8 minutes
(Note 1) High-cis-1,4-polybutadiene, manufactured by Japan Synthetic Rubber Co., Ltd.
(Note 2) Antioxidant, manufactured by Yoshitomi Pharmaceutical Industries, Ltd.

Examples 1 to 5 and Comparative Examples 1 to 6

(a) Inner cover layer

An inner cover layer was formed by injection-molding the cover formulations A to D shown in Table 2 on the above core. The cover formulation, cover thickness, Shore D hardness and specific gravity of the formed inner cover layer are shown in Table 3.

(b) Outer cover layer

An outer cover layer was formed by injection-molding the cover formulations E to I shown in Table 2 on the above inner cover layer obtained by above (a). The cover formulation, cover thickness, Shore D hardness and specific gravity of the formed outer cover layer are shown in Table 3.

TABLE 2

| Type | A | B | C | D | E | F | G | H | I |
|---|---|---|---|---|---|---|---|---|---|
| Hi-milan (Note 3) #1557 | — | — | — | — | — | 5 | 30 | — | — |
| Hi-milan (Note 3) #1605 | — | — | — | — | 25 | 20 | — | 42.5 | — |
| Hi-milan (Note 3) #1652 | — | — | — | — | — | — | — | — | 30 |
| Hi-milan (Note 3) #1706 | 50 | 47.5 | 25 | 25 | — | — | 42.5 | 20 | |
| Hi-milan (Note 3) #1707 | — | — | — | — | — | — | 20 | — | 20 |
| Hi-milan (Note 3) #1855 | — | — | — | — | 50 | 75 | 50 | — | 30 |
| Iotec (Note 4) #8000 | 50 | 47.5 | 75 | 75 | — | — | — | — | — |
| AMNOD (Note 5) | — | 5.0 | — | — | — | — | — | 15.0 | — |
| Tungsten | 32.3 | 31.9 | — | 81.8 | — | — | — | — | — |
| Titanium oxide | — | — | — | — | 0.3 | 0.3 | 0.3 | 0.3 | 0.3 |
| Barium sulfate | — | — | 2.5 | — | 0.3 | 0.3 | 0.3 | 0.3 | 0.3 |
| Antioxidant (Note 6) | — | — | — | — | 0.03 | 0.03 | 0.03 | 0.03 | 0.03 |

(Note 3) Ionomer resin, manufactured by Mitsui Du Pont Polychemical Co., Ltd.
(Note 4) Ionomer resin, manufactured by Exxon Co.
(Note 5) Nylon 12, manufactured by Toray Co., Ltd.
(Note 6) Antioxidant, manufactured by Sankyo Co., Ltd.

The flight distance and spin amount due to a driver (No. 1 wood club) as well as spin amount and shot feel due to a sand wedge of the resultant golf balls were evaluated. The results are shown in Table 3. The test methods are as follows.

(Test methods)

① Flight distance and spin amount

A driver was fit to a swing robot manufactured by True Temper Co., Ltd. and a golf ball was hit with a head speed of 45 m/second to measure the distance (carry) to the dropping point as the flight distance. The spin amount was determined by continuously taking photographs of the hit gold ball. According to the same manner as that described above, a sand wedge was fit to a swing robot manufactured by True Temper Co., Ltd. and a golf ball was hit with a head speed of 19.2 m/second to measure the distance (carry) to the dropping point as the flight distance. The spin amount was determined by continuously taking photographs of the hit gold ball.

② Shot feel

A golf ball was practically hit by 10 top professional golfers to evaluate the shot feel. The criteria thereof are as follows.

Evaluation criteria

⊚: Excellent

○: Good

Δ: Ordinary

XH: Poor (too hard)

XS: Poor (too soft)

TABLE 3

(Test Results)

|  | Example | | | | | Comparative Example | | | | | |
|---|---|---|---|---|---|---|---|---|---|---|---|
| Item | 1 | 2 | 3 | 4 | 5 | 1 | 2 | 3 | 4 | 5 | 6 |
| Core | | | | | | | | | | | |
| Formulation | I | I | I | II | II | III | IV | V | VI | I | I |
| Diameter (mm) | 35.1 | 35.1 | 35.1 | 351 | 35.1 | 35.1 | 35.1 | 35.1 | 35.1 | 35.1 | 35.1 |
| Compression deformation amount (mm) | 4.8 | 4.8 | 4.8 | 5.5 | 5.5 | 6.3 | 3.5 | 4.8 | 4.8 | 4.8 | 4.8 |
| Inner cover | | | | | | | | | | | |
| Formulation | A | A | B | A | A | A | A | C | D | A | A |
| Thickness (mm) | 1.9 | 1.9 | 1.9 | 1.9 | 1.9 | 1.9 | 1.9 | 1.9 | 1.9 | 1.9 | 1.9 |
| Shore D-scale hardness | 70 | 70 | 72 | 70 | 70 | 70 | 70 | 70 | 70 | 70 | 70 |
| Specific gravity | 1.25 | 1.25 | 1.25 | 1.25 | 1.25 | 1.25 | 1.25 | 0.98 | 1.66 | 1.25 | 1.25 |
| Outer cover | | | | | | | | | | | |
| Formulation | E | F | E | E | I | E | E | E | E | G | H |
| Thickness (mm) | 1.9 | 1.9 | 1.9 | 1.9 | 1.9 | 1.9 | 1.9 | 1.9 | 1.9 | 1.9 | 1.9 |
| Shore D-scale hardness | 66 | 63 | 66 | 66 | 64 | 66 | 66 | 66 | 66 | 59 | 73 |
| Specific gravity | 0.98 | 0.98 | 0.98 | 0.98 | 0.98 | 0.98 | 0.98 | 0.98 | 0.98 | 0.98 | 0.98 |
| Ball physical properties | | | | | | | | | | | |
| Driver Carry (yard) | 210.9 | 209.3 | 210.2 | 208.7 | 209.8 | 205.4 | 208.6 | 206.9 | 207.2 | 205.6 | 209.5 |
| Spin (rpm) | 2650 | 2710 | 2610 | 2560 | 2680 | 2420 | 2780 | 2790 | 2730 | 2820 | 2600 |
| Sandwedge Spin (rpm) | 5690 | 5800 | 5720 | 5840 | 5760 | 5880 | 5790 | 5670 | 5610 | 5920 | 5580 |
| Feeling | ○ | ○ | △ | ◎ | ○ | XS | XH | ○ | ○ | ○ | XH |

As is apparent from the above results, the core is softened and the hardness of the cover is reduced as shown in Table 3 so as to improve the shot feel and controllability at the time of hitting in Examples 1 to 5 of the present invention, and the golf balls of Examples 1 to 5 are superior in shot feel and controllability at the time of hitting as well as flight performance.

What is claimed is:

1. A solid golf ball comprising a core (1) and a cover formed on the core, the cover having a two-layer cover structure of an inner cover layer (2) and an outer cover layer (3), wherein the core (1) is obtained from a rubber composition comprising 100 parts by weight of a base rubber and 18 to 28 parts by weight of a metal salt of an unsaturated carboxylic acid and the inner cover layer (2) has a specific gravity of 1.2 to 1.5, a thickness of 0.5 to 2.0 mm and a Shore D hardness within the range of more than that of the outer cover layer (3) and not more than 80 and, the outer cover layer (3) has a specific gravity of 0.5 to less than 1.2, a thickness of 1.0 to 2.5 mm and a Shore D hardness of 63 to 73.

2. The solid golf ball according to claim 1, wherein the core has a deformation amount formed between an initial load of 10 kg and a final load 130 kg within the range from 4.0 to 6.0 mm.

3. The solid golf ball according to claim 1, wherein the inner cover layer is formed from an ionomer resin.

4. The solid golf ball according to any one of claim 1, wherein the inner cover layer (2) is formed from a mixture of an ionomer resin and a polyamide resin and an amount of the polyamide resin formulated is within the range from 3 to 25% by weight.

5. The solid golf ball according to claim 3 or 4, wherein the inner cover layer (2) further comprises high-specific gravity filler.

* * * * *

UNITED STATES PATENT AND TRADEMARK OFFICE
CERTIFICATE OF CORRECTION

PATENT NO. : 5,730,664
DATED : March 24, 1998
INVENTOR(S) : Takeshi SAKURA et al.

It is certified that error appears in the above-indentified patent and that said Letters Patent is hereby corrected as shown below:

on the front page of the Patent, left column between items 22 & 51 insert:

-- [30] Foreign Application Priority Data
Oct. 11, 1995 [JP] Japan 7-262886
Mar. 19, 1996 [JP] Japan 8-62916--

Signed and Sealed this

Twenty-ninth Day of December, 1998

Attest:

BRUCE LEHMAN

Attesting Officer    Commissioner of Patents and Trademarks